No. 721,781. PATENTED MAR. 3, 1903.
A. B. CASE.
METHOD OF FORMING PAWL OPENINGS THROUGH ROUND SHAFTS OF METAL.
APPLICATION FILED FEB. 4, 1903.
NO MODEL.
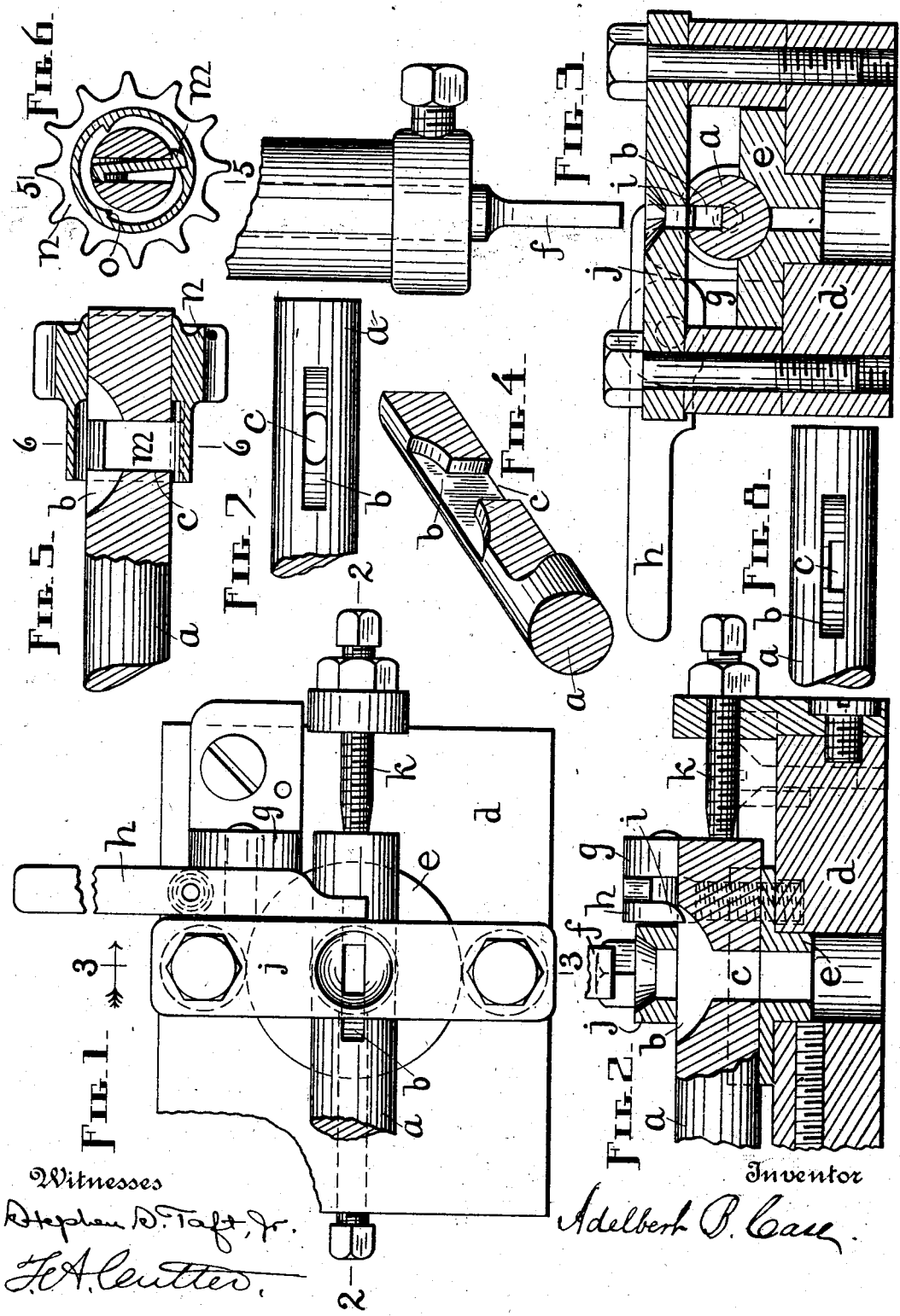
Witnesses
Stephen D. Taft, Jr.
H. A. Cutter.
Inventor
Adelbert B. Case

UNITED STATES PATENT OFFICE.

ADELBERT B. CASE, OF SPRINGFIELD, MASSACHUSETTS.

METHOD OF FORMING PAWL-OPENINGS THROUGH ROUND SHAFTS OF METAL.

SPECIFICATION forming part of Letters Patent No. 721,781, dated March 3, 1903.

Application filed February 4, 1903. Serial No. 141,780. (No model.)

*To all whom it may concern:*

Be it known that I, ADELBERT B. CASE, a citizen of the United States of America, residing in Springfield, in the county of Hampden and State of Massachusetts, have invented new and useful Improvements in Methods of Forming Pawl-Openings Through Round Shafts of Metal, of which the following is a specification.

Heretofore in the manufacture of lawn-mowers and other similar mechanisms requiring a shaft adapted to be rotated in one direction by the engagement of a pawl mounted in the shaft and engaging internally-arranged pawl-teeth in a pinion-gear or other operative device mounted on the shaft it has been found extremely difficult and expensive to form suitable pawl-receiving openings in the shaft. Shafts of the character referred to are subjected to very severe torsional strain, and it is desirable that the shaft, while being light and of a fine quality of metal, should contain solid metal between the pawl-slot and the ends of the shaft in order to give to the shaft the requisite strength to stand the torsional strain to which it is liable to be subjected, and in order to enable manufacturers to employ such construction to advantage it is requisite that the pawl-openings be cheaply and rapidly made without distorting the metal adjacent to such openings. Heretofore it has been common to make such shafts of cast grey or malleable iron, the pawl-receiving openings in such shafts being cored. The openings thus formed, however, have not been accurate and uniform, so as to give the pawl its proper bearing, and it has been found necessary to finish the pawl-openings after the shaft is cast and annealed, and as smooth accurate shafts are required it then became necessary to turn down the whole length of shaft to the requisite size, or, in some instances, the ends only of the shaft have been cast, so as to form the pawl-openings therein, as before explained, these ends being attached to the cutter-frame or mounted as extensions to the end portions of the shaft. It will be readily observed that a shaft in whole or in part of cast metal is objectionable because of liability of fracture and is expensive because of the necessity of the several operations required in order to produce the required accuracy. An effort has also been made to provide suitable pawl-openings in steel bars or shafts by slotting the end of the shaft and then inserting a block in the slot at its end and driving pins through the shaft and the inserted piece. It has been found, however, that such construction is not only expensive, but exceedingly defective, as the torsional strain is such in some instances as to distort the end of the shaft when subjected to the necessary strain required for the machine to do its work, and the expense involved in milling the slot in the end of the shaft, fitting a block therein, fastening the block in position, and then turning off and finishing the surface has greatly increased the cost. To overcome the latter defect, shafts have been constructed by cutting an open slot in the end, as before described, and forming a shoulder at the extreme end of the shaft and then inserting a block provided at its outer end with a ring integral therewith, which ring sets over the end of the shaft and in the shouldered recess adapted to receive it and upsetting the end of the shaft to prevent the escape of the ring, thus in a measure preventing the spreading of the shaft at the ends and the distortion resulting from torsional strain, as before described. This also has been found expensive on account of the cost of milling into the ends. Construction of the ring-provided block and finishing after the block is in place are very defective, as the ring is liable to become loose and render the device inoperative. Such shafts have also been constructed from a piece of steel bar or rod of the diameter of the finished shaft by drilling two or more openings through the same at the points where the pawl-openings are to be located and then filing out the material to form a rectangular opening. This is objectionable on account of the time and expense of filing out the material around the drilled openings to give the requisite shape, and to avoid the delay and expense of filing the openings have in some instances been broached. This, however, unless done with extreme care, spreads the metal and renders it necessary to finish the exterior of the shaft after the broaching operation, all of which is slow and expensive.

The object of my invention, therefore, is to provide a method of expeditiously, economically, and effectively forming a pawl-slot through a round shaft without weakening or distorting the shaft and so as to leave solid metal between the pawl-opening and the end of the shaft; and to that end my invention consists in first forming a slot or opening, preferably by milling into one side of the shaft toward its center, and then punching out a pawl-opening to the other side of the shaft.

As cutter-shafts for lawn-mowers are of quite small diameter and the strain or impact on the pawl is very severe, the pawl should have sufficient body to give the requisite strength to withstand the strain, and as it will not do to cut away too much of the shaft in the direction of its diameter to form the pawl-opening I find that the best shape of opening for the reception of a pawl of the proper size and strength to operate best and last longest is substantially rectangular, it extending farther in the direction of the length of the shaft than in the direction of its diameter, and while a pawl-opening rectangular, or substantially so, in cross-section is the best it will readily be seen that an opening oblong in cross-section, with its corners or sides curved, will provide an opening to receive a pawl which will operate substantially as well as if exactly or substantially rectangular in cross-section, and I do not limit myself to any exact shape of the side walls of such opening. The opening should, however, as before stated, be greater longitudinally of the shaft than crosswise, as more metal can be spared from the shaft in the direction of its length than in the direction of its diameter. The necessity of first forming an opening in the surface of the bar by milling or otherwise prior to the punching operation will be seen in the fact that it is a mechanical impossibility to punch an accurate rectangular opening through a round shaft of metal without first forming a recess upon one side, as it is found in practice that the punch will creep if first applied to the round surface and the shaft is liable to turn slightly in its bearing, so that the punched opening will not be formed with the accuracy required for the mechanical construction before referred to. This difficulty is especially found in employing cold-rolled steel shafts, as the process of rolling or drawing such shafts forms a very hard skin or shell on the outer surface, and it is of course very desirable to avoid distortion and preserve this hard outer shell or skin, as it furnishes a more lasting bearing and stronger device.

The mechanical appliances employed by me to carry out my invention and as at present advised deemed by me to be the best are illustrated in the accompanying drawings, in which—

Figure 1 is a plan view of a fixture, showing a round bar of metal or shaft mounted therein, the end portion of which shaft is provided with the preliminary recess or slot. Fig. 2 is an elevation of the same in section, taken on line 2 2 of Fig. 1. Fig. 3 is an elevation in section, taken on line 3 3 of Fig. 1. Fig. 4 is a perspective view of the end portion of a shaft, a portion of the metal being broken away, disclosing the pawl slot or opening. Fig. 5 is a longitudinal sectional view showing a shaft mounted in a driving-pinion and a pawl mounted in the pawl-opening. Fig. 6 is a transverse sectional view taken on line 6 6 of Fig. 5, and Figs. 7 and 8 illustrate modifications in the shape of the openings.

In detail, $a$ indicates a shaft or round bar of metal; $b$, a recess formed in one side and at the end portion thereof; $c$, a rectangular opening extending from the bottom of the slot $b$ to the opposite side of the bar; $d$, base or body portion of the fixture; $e$, a recessed die or bed therein; $f$, a punch rectangular in cross-section; $g$, clamping-arm; $h$, operating-lever; $i$, a downwardly-extending lug adapted to enter the slot $b$, and $j$ a registering screw.

In the carrying out of my invention I am enabled to use a fine quality of bright cold-rolled cylindrical metal of the diameter of the finished shaft, and this being cut of the proper length is placed in a milling-machine and an opening $b$ milled into the surface for a short distance. In some cases I prefer that this milled opening approach the center of the bar, while in others the opening need be of sufficient depth only to give to the punch a seat or bearing to avoid creeping and give to the bar the requisite rigidity and prevent rocking when subjected to the punching operation. After milling the slot in the surface at one side of the shaft it is inserted in the fixture illustrated in the drawings and is held in accurate register therein by the clamping devices shown, after which the punching operation is performed, the pawl-opening being substantially rectangular in cross-section and finished with the requisite accuracy without further treatment. I prefer that the milled opening or recess be of the same width as the pawl-opening to be formed, thus giving a bearing for the faces of the pawl on both sides of the shaft. Of course, if desired, the pawl-opening may be formed with rounded corners or curved walls.

I am aware that heretofore it has been common to drill an opening of one size and employ said opening as a guide to drill another opening from the bottom of the first. This, however, would be of no assistance whatever in the forming of a substantially rectangular opening through a round shaft of metal, as it would become necessary, as before stated, to broach a round opening in order to render it rectangular, or substantially so, in cross-section, and this, while being expensive and difficult and unless performed with the greatest care, spreads the material, rendering it necessary to refinish the outer surface of the shaft in order to give the accuracy required.

It will be readily seen that any suitable fixture for holding the shaft may be employed.

Having therefore described my invention, what I claim, and desire to secure by Letters Patent, is—

1. The herein-described method of forming a pawl-opening of unequal cross-section laterally through a round shaft of metal, consisting of first forming a slot in one side of the shaft parallel with its axis and then punching out the material of the desired shape in cross-section from the bottom of the slot to the other side of the shaft.

2. The herein-described method of forming a substantially rectangular perforation through a round shaft of metal, consisting in first milling into the shaft from one side in a line parallel with its axis, then punching out the metal (to form a pawl-opening) from the bottom of the milled slot through to the other side of the shaft of the same width of said milled slot but of less length.

3. The herein-described method of forming a perforation of unequal cross-section through a round metal shaft which consists in slotting the surface of the shaft in parallelism with its axis to a depth approximately equal to the radius of the shaft, and then punching out the metal of the desired shape in cross-section through the slot to the other side of the shaft.

ADELBERT B. CASE.

Witnesses:
STEPHEN S. TAFT, Jr.,
ALLEN WEBSTER.